United States Patent Office 3,278,430
Patented Oct. 11, 1966

3,278,430
AQUEOUS BASE LUBRICANT AND
LIKE MATERIAL
George D. Williams, Rocky River, Ohio, assignor to Skotch Products Corp., Cleveland, Ohio, a corporation of Ohio
No Drawing. Filed Mar. 29, 1965, Ser. No. 443,659
8 Claims. (Cl. 252—33.6)

The present invention relates to aqueous base materials having good lubricating properties and to their methods of production.

An object of the invention is the provision of novel and improved aqueous base materials or compositions having good lubricating or antiwear properties and which are relatively low in cost, made of readily obtainable materials and can be used with conventional equipment including automatic lubricating equipment especially adapted for lubricating the dust stops of internal mixers used in the polymer working industries, particularly in the rubber industry. The materials are not only compatible with the materials used in the mixers and will lubricate and flush the dust stops but will also act as a liquid dust barrier and prevent the material in the mixer which might reach the dust stops from clinging to the surfaces thereof.

Another object of the invention is the provision of novel and improved materials or compositions of the character referred to, comprising an aqueous base material having ingredients which in their original form are neither soluble or dispersible in water.

Further objects of the invention will be apparent from the following description of the invention.

A typical dust stop of the type referred to is shown in United States Patent No. 2,705,653.

Referring to the dust stops shown in said patent, the lubricant is forced or injected under pressure into the end or ends of the space or spaces between the end assembly or plate and the floating ring or rings near the wear plate or plates and, if desired, between the contacting surface or surfaces between the floating ring or rings and the wear plate or plates through apertures in the wear plate or plates as is the case in commercial Banbury mixers of the type shown in said patent. The materials of the present invention, as previously stated, have good antiwear characteristics, relatively low viscosity, are compatible with the materials in the mixer with which it comes in contact, function as a liquid dust barrier, etc. thus fulfilling all of the requirements of a dust stop lubricant and at the same time is readily available, easily manufactured and comparatively inexpensive.

Generally speaking the invention comprises the provision of an aqueous base liquid material containing a fatty acid substance with or without one or more of the following: glycerine, tetrasodium salt of ethylene diamine tetra acetic acid, cetyl palmitate or wax, the latter being preferably a high melting glyceride and free fatty acids above carbon 18, saponified in any heated vessel suitable for saponification.

It has been found that the following are particularly suitable compounds for the purposes stated when formulated with about sixty (60) parts water:

Example 1

| | Parts |
|---|---|
| Potassium salt of coconut oil fatty acid | 60 |
| Potassium salt of refined tall oil fatty acid | 25 |
| Glycerine | 7 |
| Tetrasodium salt of ethylene diamine tetraacetic acid | 1 |
| Cetyl palmitate | 3.5 |
| Wax (high melting glycerides and free fatty acids above carbon 18) | 3.5 |

Example 2

| | Parts |
|---|---|
| Potassium salt of coconut oil fatty acid | 85 |
| Glycerine | 7 |
| Tetrasodium salt of ethylene diamine tetraacetic acid | 1 |
| Cetyl palmitate | 3.5 |
| Wax (high melting glycerides and free fatty acids above carbon 18) | 3.5 |

Example 3

| | Parts |
|---|---|
| Potassium salt of refined tall oil fatty acid | 92 |
| Tetrasodium salt of ethylene diamine tetraacetic acid | 1 |
| Cetyl palmitate | 3.5 |
| Wax (high melting glycerides and free fatty acids above carbon 18) | 3.5 |

The potassium salt or salts and/or glycerine and/or cetyl palmitate are preferably prepared in an aqueous medium by saponification in any heated vessel suitable for saponification, such as, a steam jacketed open kettle, with the cetyl palmitate, when used, being added in a melted or liquid state at the first reaction stage. After complete saponification the wax or waxes are added. The mixtures are cooled to room temperature while being continuously agitated and the viscosity periodically checked and water added, if necessary, to maintain the desired viscosity range. The material is subsequently pumped into steel tanks and allowed to age for 72 hours. During this period it should be checked every twelve hours for viscosity and color, and if necessary water additions made.

The aforementioned examples, when diluted with water, to contain about 1.6% solids showed good antiwear characteristics on a Falex test machine. The first example sustained a load pressure of 3750 pounds without failure; the second and third examples, 3250 pounds. The materials of the present invention when used in the dust stops of compounding or mixing machines used in the polymer working arts and more particularly in the rubber working arts have as good or better lubricating characteristics than typical petroleum dust stop oils and considerably better antiwear characteristics. In addition they maintain the dust stops clean as they prevent material in the mixers reaching the dust stops from clinging to the surfaces thereof.

While preferred materials have been mentioned above the material can be made from all vegetable, animal, and fish oils or fats and all synthetic fatty acids, such as, pelargonic, and can be manufactured with various saponification agents, such as, sodium, potassium and any organic amine capable of saponifying oils and fats. The term fatty acid as used in the claims include both fats and oils. The material may be handled or marketed as a solid or paste with as low as ten percent (10%) water. It is, however, preferably marketed as a liquid or paste with a preferred anhydrous range of about 40% to 60% or more, and diluted any desired amount, even greater than that mentioned above, at the time of use.

While three preferred examples have been given, the material may contain merely a saponified fatty acid, for example, potassium salt of coconut fatty acid and glycerine, potassium salt of tall oil fatty acid, etc. The other additives or constituents merely enhance certain properties. The so-called additives are not limited to those mentioned but any other suitable additives may be included.

While the invention has been described in connection with certain specific embodiments, particularly suitable as a lubricant for lubricating the dust stops of an internal mixer, it is also useful as a journal lubricant and as a fire-resistant fluid in hydraulic systems generally not only because of its better wearing characteristics than conventional emulsion or water glycol-type hydraulic fluids but otherwise. It also out-performs straight synthetic fire-resistant hydraulic fluids, such as, phosphate esters.

It is to be understood that the embodiments and uses mentioned are illustrative only of the invention and that the invention is not limited thereto.

What I claim is:

1. As an article of commerce a homogeneous stable lubricous material consisting essentially of water and from about two hundredths of one percent to about ninety percent of a saponified fatty acid and at least one of the following: gycerine, tetrasodium salt of ethylene diamine tetraacetic acid, cetyl palmitate, and wax composed of high melting glycerides and free fatty acids above 18 carbon atoms.

2. As an article of commerce a homogeneous stable material consisting essentially of water and from about two hundredths of one percent to about ninety percent of the following: a saponified fatty acid about eighty-five parts to ninety-nine parts, and one or more of the following: glycerine about six parts to eight parts, tetrasodium salt of ethylene diamine tetraactic acid about one-fourth of one part to one part, cetyl palmitate, about three parts to seven parts, from about two parts to three parts wax composed of high melting glycerides and free fatty acids above 18 carbon atoms.

3. As an article of commerce a homogeneous stable material consisting essentially of water and from about two-hundredths of one percent to about ninety percent of the following: potassium salt of coconut oil fatty acid about sixty parts to eighty-five parts, potassium salt of refined tall oil fatty acid about twenty parts to thirty parts, and one or more of the following: glycerine about six parts to eight parts, tetrasodium salt of ethylene diamine tetraacetic acid about one-fourth of one part to one part, cetyl palmitate, about three parts to seven parts, from about two parts to three parts wax composed of high melting glycerides and free fatty acids above 18 carbon atoms.

4. As an article of commerce a homogeneous stable material consisting essentially of water and from about two-hundredths of one percent to about ninety percent of potassium salt of coconut oil fatty acid and one or more of the following: glycerine about six parts to eight parts, tetrasodium salt of ethylene diamine tetraacetic acid about one-fourth of one part to one part, cetyl palmitate, about three parts to seven parts, from about two parts to three parts of wax composed of high melting glycerides and free fatty acids above 18 carbon atoms.

5. As as article of commerce a homogeneous stable material consisting essentially of water and from about two-hundredths of one percent to about ninety percent of potassium salt of refined tall oil fatty acid and one or more of the following: glycerine about six parts to eight parts, tetrasodium salt of ethylene diamine tetraacetic acid about one-fourth of one part to one part, cetyl palmitate, about three parts to seven parts, from about two parts to three parts of wax composed of high melting glycerides and free fatty acids above 18 carbon atoms.

6. In the method of operating an internal mixer wherein a liquid is continuously circulated through a dust stop, the improvement which comprises circulating through the dust stop a homogeneous stable material consisting essentially of water about ninety-five percent to ninety-nine and one-half percent and saponified fatty acid.

7. In the method of operating an internal mixer wherein a liquid is continuously circulated through a dust stop, the improvement which comprises circulating through the dust stop a homogeneous stable material consisting essentially of water about ninety-five percent to ninety-nine and one-half percent saponified fatty acid and at least one of the following: glycerine, tetrasodium salt of ethylene diamine tetraacetic acid, cetyl palmitate, and wax composed of high melting glycerides and free fatty acids above 18 carbon atoms.

8. In the method of operating an internal mixer wherein a liquid is continuously circulated through a dust stop, the improvement which comprises circulating through the dust stop a homogeneous stable material consisting essentially of water about ninety-five percent to ninety-nine and one-half percent and the remainder saponified fatty acid about eighty-five parts to ninety-nine parts, and one or more of the following: glycerine about six parts to eight parts, tetrasodium salt of ethylene diamine tetraacetic acid about one-fourth of one part to one part, cetyl palmitate, about three parts to seven parts, from about two parts to three parts wax composed of high melting glycerides and free fatty acids above 18 carbon atoms.

References Cited by the Examiner

UNITED STATES PATENTS

| Re. 1,080 | 11/1960 | McMunn | 252—41 |
| 1,900,759 | 3/1933 | Arveson | 252—49.3 |
| 1,907,920 | 5/1933 | Wilkin | 252—49.5 |
| 2,443,766 | 6/1948 | Hedberg | 252—88 X |
| 2,538,199 | 1/1951 | Jefferson et al. | 252—88 |
| 2,762,775 | 9/1956 | Foehr | 252—56 |

FOREIGN PATENTS

| 170,705 | 11/1921 | Great Britain. |
| 509,645 | 2/1955 | Canada. |

DANIEL E. WYMAN, *Primary Examiner.*

C. F. DEES, *Assistant Examiner.*